United States Patent
Nishida (10) Patent No.: US 10,845,096 B2
(45) Date of Patent: Nov. 24, 2020

(54) REFRIGERATION CYCLE DEVICE

(71) Applicant: DENSO CORPORATION, Kariya (JP)

(72) Inventor: Yasushi Nishida, Kariya (JP)

(73) Assignee: DENSO CORPORATION, Kariya (JP)

( * ) Notice: Subject to any disclaimer, the term of this patent is extended or adjusted under 35 U.S.C. 154(b) by 234 days.

(21) Appl. No.: 15/744,450

(22) PCT Filed: Sep. 23, 2016

(86) PCT No.: PCT/JP2016/078023
§ 371 (c)(1),
(2) Date: Jan. 12, 2018

(87) PCT Pub. No.: WO2017/073212
PCT Pub. Date: May 4, 2017

(65) Prior Publication Data
US 2018/0209697 A1 Jul. 26, 2018

(30) Foreign Application Priority Data

Oct. 27, 2015 (JP) ................................ 2015-210986

(51) Int. Cl.
*F25B 1/10* (2006.01)
*F25B 47/02* (2006.01)
(Continued)

(52) U.S. Cl.
CPC .............. *F25B 1/10* (2013.01); *F25B 47/02* (2013.01); *F25B 49/022* (2013.01);
(Continued)

(58) Field of Classification Search
CPC ...... F25B 47/02; F25B 47/022; F25B 47/025; F25B 2347/021; F25B 2347/02;
(Continued)

(56) References Cited

U.S. PATENT DOCUMENTS 6,205,800 B1 * 3/2001 Topper ................. A47F 3/0404
62/128
6,964,172 B2 11/2005 Dudley et al.
(Continued)

FOREIGN PATENT DOCUMENTS

EP  1826513 A1  8/2007
EP  2157380 A1  2/2010
(Continued)

*Primary Examiner* — Nelson J Nieves
*Assistant Examiner* — Meraj A Shaikh
(74) *Attorney, Agent, or Firm* — Harness, Dickey & Pierce, P.L.C.

(57) ABSTRACT

A refrigeration cycle device includes a first physical quantity detector that detects a first physical quantity having a correlation with a temperature of refrigerant flowing into an evaporator, a second physical quantity detector that detects a second physical quantity having a correlation with a temperature of ventilation air heat-exchanged in the evaporator to be blown into a space to be cooled, a defrosting operation determination portion that determines whether a defrosting operation of the evaporator is to be started based on whether a temperature difference between the temperature of the refrigerant specified by the first physical quantity and the temperature of the ventilation air specified by the second physical quantity is equal to or larger than a determination threshold value, and a defrosting operation execution portion that performs the defrosting operation of the evaporator when it is determined that defrosting operation of the evaporator is to be started.

16 Claims, 3 Drawing Sheets

(51) Int. Cl.
*F25B 19/02* (2006.01)
*F25D 21/02* (2006.01)
*G05B 13/04* (2006.01)
*G05D 23/20* (2006.01)
*F25D 21/00* (2006.01)
*G05D 23/19* (2006.01)
*F25B 49/02* (2006.01)
*F25B 47/00* (2006.01)

(52) U.S. Cl.
CPC ........... *F25D 21/006* (2013.01); *F25D 21/02* (2013.01); *G05B 13/042* (2013.01); *G05D 23/1927* (2013.01); *G05D 23/20* (2013.01); *F25B 47/006* (2013.01); *F25B 2400/13* (2013.01); *F25B 2700/171* (2013.01); *F25B 2700/173* (2013.01); *F25B 2700/2106* (2013.01); *F25B 2700/2117* (2013.01); *F25B 2700/21163* (2013.01); *F25B 2700/21172* (2013.01); *F25B 2700/21173* (2013.01); *G05D 23/1917* (2013.01)

(58) Field of Classification Search
CPC .... F25B 2347/023; F25D 21/02; F25D 21/04; F25D 21/06; F25D 21/004; F25D 21/008
See application file for complete search history.

(56) References Cited

U.S. PATENT DOCUMENTS

| | | | |
|---|---|---|---|
| 2009/0266093 A1* | 10/2009 | Aoki | F25B 47/025 62/155 |
| 2012/0031985 A1* | 2/2012 | Do | G05D 23/1928 236/46 A |
| 2013/0206851 A1* | 8/2013 | Sekiguchi | F16K 31/04 236/92 B |

FOREIGN PATENT DOCUMENTS

| | | | | |
|---|---|---|---|---|
| JP | S58221366 A | | 12/1983 | |
| JP | 2006084133 A | | 3/2006 | |
| JP | 2007155299 A | | 6/2007 | |
| JP | 2008128609 A | * | 6/2008 | |
| JP | 2008304137 A | | 12/2008 | |
| JP | 2012180963 A | | 9/2012 | |
| WO | WO-2012169146 A1 | * | 12/2012 | F25B 1/10 |

\* cited by examiner

REFRIGERATION CYCLE DEVICE

CROSS REFERENCE TO RELATED APPLICATIONS

This application is a U.S. National Phase Application under 35 U.S.C. 371 of International Application No. PCT/JP2016/078023 filed on Sep. 23, 2016 and published in Japanese as WO 2017/073212 A1 on May 4, 2017. This application is based on and claims the benefit of priority Japanese Patent Application No. 2015-210986 filed on Oct. 27, 2015. The entire disclosures of all of the above applications are incorporated herein by reference.

FIELD OF THE INVENTION

The present disclosure relates to a refrigeration cycle device in which a refrigerant circulates.

BACKGROUND ART

For example, Patent Document 1 describes a refrigeration cycle device that has an electric heater for heating an evaporator and periodically performs a defrosting operation by the electric heater. The refrigeration cycle device is configured to estimate how much frost is attached from the amount of electric power consumed by the electric heater for the defrosting, and then to determine an optimal interval before a subsequent defrosting operation.

RELATED ART DOCUMENT

Patent Document

Patent Document 1: U.S. Pat. No. 6,964,172

SUMMARY OF INVENTION

In various refrigerators, such as marine-container refrigerators and trailer refrigerators, the volume of air passing through the evaporator is decreased if frost formation occurs at the evaporator, leading to an increase in the temperature inside the refrigerator. When the temperature inside the refrigerator increases in this manner, cargo, for example, vegetables and flowers, might be spoiled.

The device described in the above-mentioned Patent Document 1 is configured to periodically perform the defrosting operation, and thus there could be a problem that electric power is wasted by the defrosting operation being executed even when no frost formation has occurred at the evaporator.

In such a device, a cooling operation is not performed during the defrosting operation, and thereby the temperature inside the refrigerator increases. Consequently, at the end of every defrosting operation, it is necessary to perform a cooling-down operation that quickly cools the inside of the refrigerator. That is to say, in the device configured to periodically perform the defrosting operation, the cooling-down operation also needs to be performed at the end of every defrosting operation, resulting in an increase in power consumption of fuel, electric power, or the like.

Therefore, it is an object of the present disclosure to reduce the power consumption, accompanied by a defrosting operation.

According to an aspect of the present disclosure, a refrigeration cycle device in which a refrigerant circulates includes: a compression mechanism that compresses and discharges the refrigerant; a heat radiator that exchanges heat between the refrigerant discharged from the compression mechanism and exterior air to dissipate heat from the refrigerant; an expansion valve that decompresses the refrigerant flowing out of the heat radiator; and an evaporator that exchanges heat between the refrigerant decompressed by the expansion valve and ventilation air to be blown into a space to be cooled, to evaporate the refrigerant and to cause the refrigerant to flow to a suction side of the compression mechanism.

Furthermore, the refrigeration cycle device includes: a first physical quantity detector that detects a first physical quantity having a correlation with a temperature of the refrigerant flowing into the evaporator; a second physical quantity detector that detects a second physical quantity having a correlation with a temperature of the ventilation air that is heat-exchanged in the evaporator to be blown into the space to be cooled; a defrosting operation determination portion that determines whether or not a defrosting operation of the evaporator is to be started based on whether a temperature difference between the temperature of the refrigerant specified based on the first physical quantity, detected by the first physical quantity detector, and the temperature of the ventilation air specified based on the second physical quantity, detected by the second physical quantity detector, is equal to or larger than a determination threshold value; and a defrosting operation execution portion that performs the defrosting operation of the evaporator when the defrosting operation determination portion determines that the defrosting operation of the evaporator is to be started.

With this configuration, the defrosting operation determination portion determines whether or not the defrosting operation of the evaporator is to be started based on whether or not the temperature difference between the temperature of the refrigerant specified based on the first physical quantity detected by the first physical quantity detector and the temperature of the ventilation air specified based on the second physical quantity detected by the second physical quantity detector, is equal to or larger than the determination threshold value. Therefore, the defrosting operation of the evaporator is prevented from being periodically started in a short-period cycle even when no frost is formed at the evaporator, thereby making it possible to reduce the power consumption, accompanied by the defrosting operation.

DESCRIPTION OF EMBODIMENTS

First Embodiment

Figure 1:
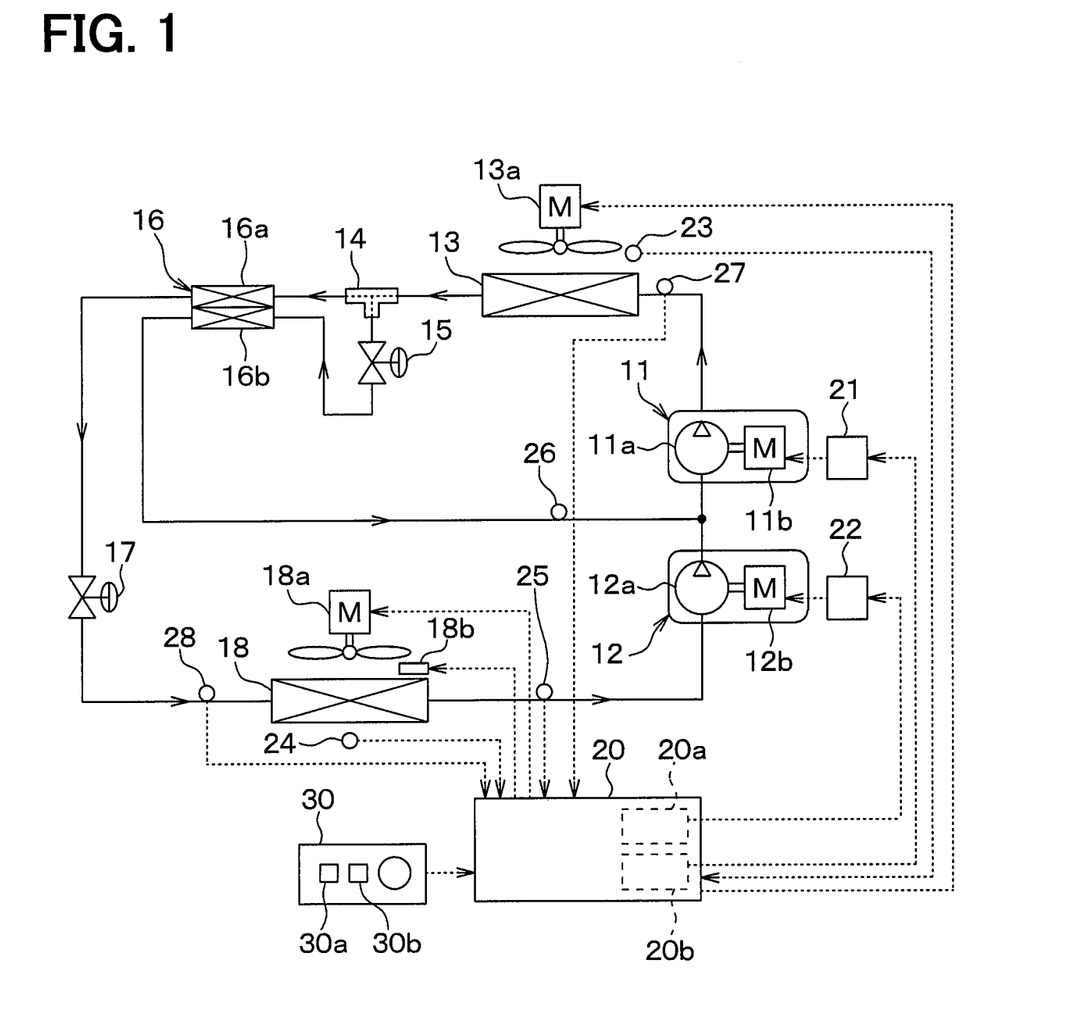
FIG. 1 is an entire configuration diagram of a multi-stage compression refrigeration cycle device in a first embodiment.
Figure 2:
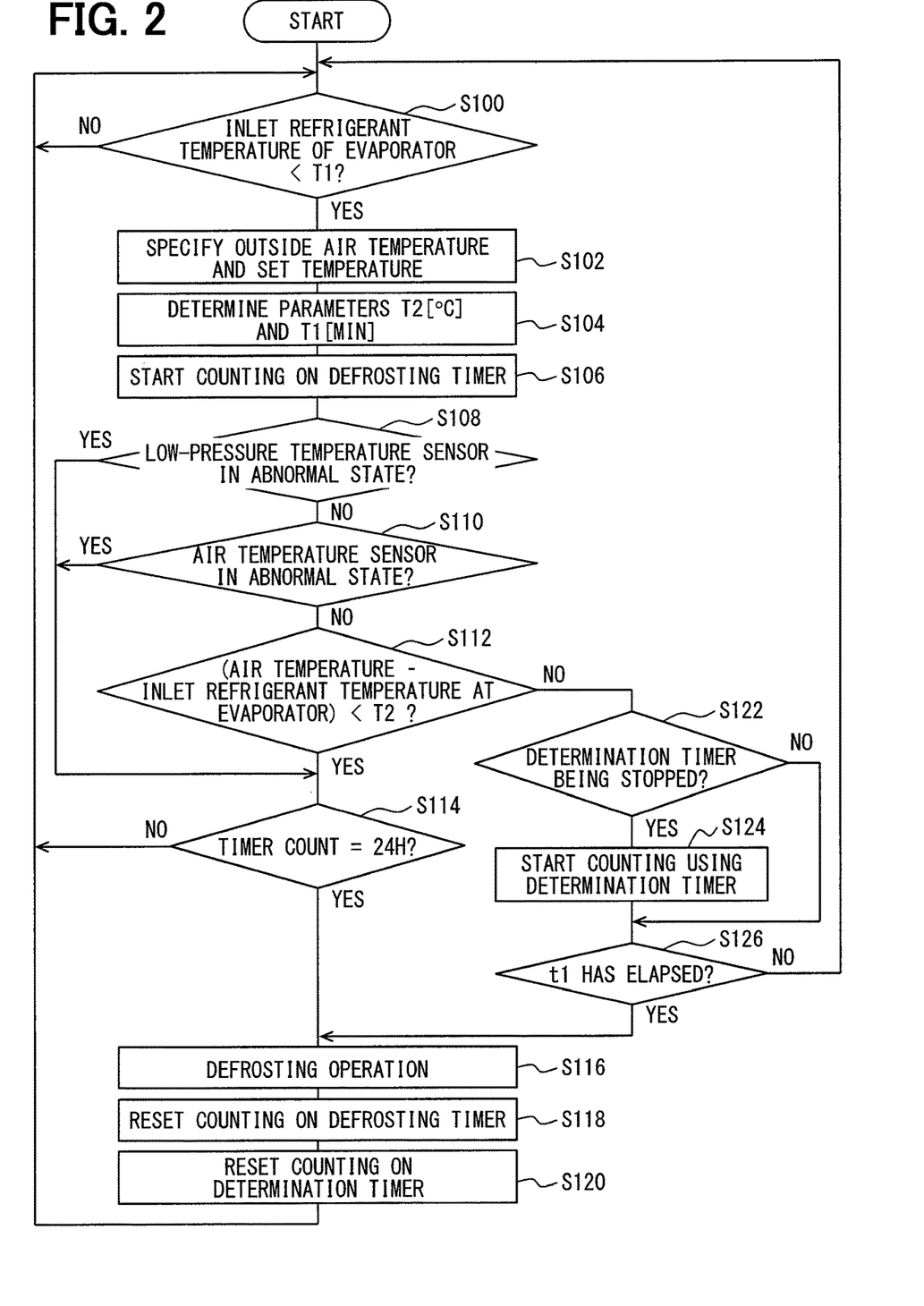
FIG. 2 is a flowchart of control processing performed by the multi-stage compression refrigeration cycle device in the first embodiment.
Figure 3:
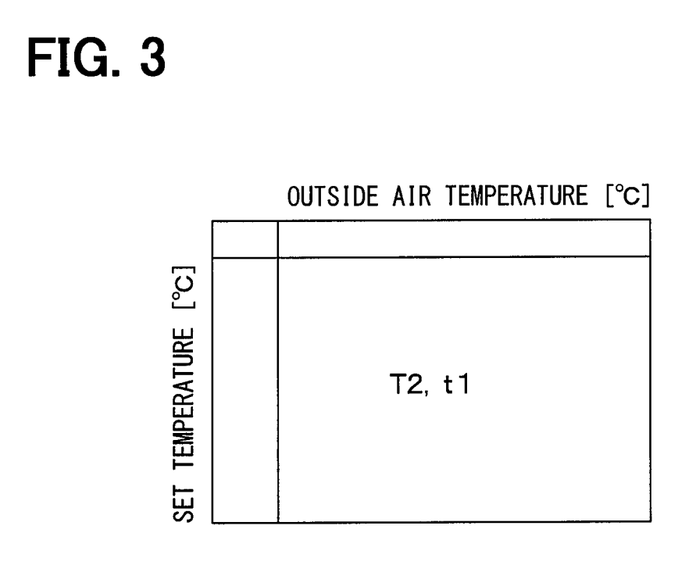
FIG. 3 is a diagram for explaining a map representing the relationship between a determination threshold value T2 and a predetermined time period t1.

A first embodiment will be described below with reference to FIGS. 1 to 3. FIG. 1 is an entire configuration diagram of a refrigeration cycle device in the present embodiment. The refrigeration cycle device is used in a refrigerator and serves to cool ventilation air to be blown into the inside of the refrigerator as a space to be cooled, to an ultralow temperature of approximately −30° C. to −10° C.

As illustrated in FIG. 1, the multi-stage compression refrigeration cycle device is a two-stage compression refrigeration cycle device that includes two compressors, namely, a high-stage side compressor 11 and a low-stage side compressor 12. The two-stage compression refrigeration cycle device pressurizes a refrigerant circulating through the cycle in multiple stages. As the refrigerant, a normal fluorocarbon refrigerant (for example, R404A) can be used. Further, the refrigerant has a refrigerating oil mixed therein to lubricate sliding parts in the high-stage side compressor 11 corresponding to a first compression mechanism and the low-stage side compressor 12 corresponding to a second compression mechanism. Part of the refrigerating oil circulates through the cycle together with the refrigerant.

The low-stage side compressor 12 is an electric compressor that includes a low-stage side compression mechanism 12a and a low-stage side electric motor 12b. The low-stage side compression mechanism 12a compresses a low-pressure refrigerant into an intermediate-pressure refrigerant and discharges the intermediate-pressure refrigerant. The low-stage side electric motor 12b rotatably drives the low-stage side compression mechanism 12a.

The low-stage side electric motor 12b is an AC motor that has its operation (i.e., the number of revolutions) controlled by AC current output from a low-stage side inverter 22. The low-stage side inverter 22 outputs the AC current at a frequency in response to a control signal, output from a refrigerator controller 20 to be described later. The refrigerant discharge capacity of the low-stage side compression mechanism 12a in the low-stage side compressor 12 is changed by controlling the frequency.

Thus, in the present embodiment, the low-stage side electric motor 12b configures a discharge-capacity changing portion for the low-stage side compressor 12. It is apparent that the low-stage side electric motor 12b may adopt a DC motor, and thereby the number of revolutions of the motor may be controlled by a control voltage output from the refrigerator controller 20. A discharge port of the low-stage side compression mechanism 12a in the low-stage side compressor 12 is connected to a side of a suction port of the high-stage side compressor 11.

The high-stage side compressor 11 has substantially the same basic structure as the low-stage side compressor 12. Thus, the high-stage side compressor 11 is an electric compressor that includes a high-stage side compression mechanism 11a and a high-stage side electric motor 11b. The high-stage side compression mechanism 11a compresses the intermediate-pressure refrigerant discharged from the low-stage side compressor 12 into a high-pressure refrigerant and discharges the high-pressure refrigerant.

The high-stage side electric motor 11b has the number of revolutions thereof controlled by AC current output from a high-stage side inverter 21. In the present embodiment, a compression ratio of the high-stage side compression mechanism 11a is substantially the same as a compression ratio of the low-stage side compression mechanism 12a.

A discharge port of the high-stage side compression mechanism 11a in the high-stage side compressor 11 is connected to a side of a refrigerant inlet of a heat radiator 13. The heat radiator 13 is a heat-dissipation heat exchanger that exchanges heat between the high-pressure refrigerant discharged from the high-stage side compressor 11 and air outside the refrigerator (i.e., exterior air) blown by a cooling fan 13a, thereby dissipating heat from the high-pressure refrigerant to cool the refrigerant.

In the present embodiment, the refrigerator controller 20 configures a controller that controls the numbers of revolutions of the low-stage side compression mechanism 12a and of the high-stage side compression mechanism 11a. In more detail, the refrigerator controller 20 configures a control device that controls the numbers of revolutions of the low-stage side electric motor 12b for rotating the low-stage side compression mechanism 12a and of the high-stage side electric motor 11b for rotating the high-stage side compression mechanism 11a.

The cooling fan 13a is an electric blower that has the number of revolutions or volume of blowing air controlled by a control voltage output from the refrigerator controller 20. Note that the multi-stage compression refrigeration cycle device in the present embodiment configures a subcritical refrigeration cycle in which a high-pressure side refrigerant pressure does not exceed the critical pressure of the refrigerant, using a fluorocarbon refrigerant as the refrigerant. Thus, the heat radiator 13 serves as a condenser that condenses the refrigerant.

A refrigerant outlet of the heat radiator 13 is connected to a branch portion 14 that branches the flow of refrigerant which flows out of the heat radiator 13. The branch portion 14 has a three-way joint structure with three flow inlet/outlets. One of the flow inlet/outlets is a refrigerant flow inlet, while the other two are refrigerant flow outlets. Such a branch portion 14 may be formed by joining pipes or by providing a plurality of refrigerant passages in a metal block or a resin block.

One refrigerant outlet of the branch portion 14 is connected to an inlet side of an intermediate-pressure expansion valve 15, while the other refrigerant outlet of the branch portion 14 is connected to an inlet side of a high-pressure refrigerant flow path 16a in an intermediate heat exchanger 16. The intermediate-pressure expansion valve 15 is a thermal expansion valve that decompresses and expands the high-pressure refrigerant, flowing out of the heat radiator 13, into an intermediate-pressure refrigerant and then causes the intermediate-pressure refrigerant to flow out toward a suction side of the high-stage side compression mechanism 11a.

More specifically, the intermediate-pressure expansion valve 15 has a thermo-sensitive portion disposed at an outlet side of an intermediate-pressure refrigerant flow path 16b in the intermediate heat exchanger 16. The intermediate-pressure expansion valve 15 senses a superheat degree of the refrigerant at the outlet side of the intermediate-pressure refrigerant flow path 16b based on the temperature and pressure of the refrigerant at the outlet side of the intermediate-pressure refrigerant flow path 16b. The intermediate-pressure expansion valve 15 adjusts its valve opening and further a flow rate of the refrigerant by a mechanical mechanism such that the sensed superheat degree of the refrigerant reaches a predetermined value previously set. The outlet side of the intermediate-pressure expansion valve 15 is connected to the inlet side of the intermediate-pressure refrigerant flow path 16b. The intermediate-pressure expansion valve 15 corresponds to a first expansion valve, for example.

The intermediate heat exchanger 16 exchanges heat between an intermediate-pressure refrigerant decompressed and expanded by the intermediate-pressure expansion valve 15 and circulating through the intermediate-pressure refrigerant flow path 16b and the other high-pressure refrigerant branched by the branch portion 14 and circulating through the high-pressure refrigerant flow path 16a. Since the high-pressure refrigerant is decompressed to have its temperature decreased, in the intermediate heat exchanger 16, the intermediate-pressure refrigerant circulating through the intermediate-pressure refrigerant flow path 16b is heated, while the high-pressure refrigerant circulating through the high-pressure refrigerant flow path 16a is cooled.

The specific structure of the intermediate heat exchanger 16 adopts a double-pipe heat exchanger structure in which an inner pipe forming the intermediate-pressure refrigerant flow path 16b is disposed inside an outer pipe forming the high-pressure refrigerant flow path 16a. It is apparent that the high-pressure refrigerant flow path 16a may be positioned as the inner pipe, and the intermediate-pressure refrigerant flow path 16b may be positioned as the outer pipe. Alternatively, the intermediate heat exchanger 16 may adopt a structure in which refrigerant pipes forming the high-pressure refrigerant flow path 16a and the intermediate-pressure refrigerant flow path 16b are bonded to each other to exchange heat therebetween.

The intermediate heat exchanger 16 shown in FIG. 1 adopts a parallel flow type heat exchanger in which the flow direction of the high-pressure refrigerant circulating through the high-pressure refrigerant flow path 16a is aligned with the flow direction of the intermediate-pressure refrigerant circulating through the intermediate-pressure refrigerant flow path 16b. However, a counterflow type heat exchanger may be adopted in which the flow direction of the high-pressure refrigerant circulating through the high-pressure refrigerant flow path 16a is opposite to the flow direction of the intermediate-pressure refrigerant circulating through the intermediate-pressure refrigerant flow path 16b.

The outlet side of the intermediate-pressure refrigerant flow path 16b in the intermediate heat exchanger 16 is connected to a suction port side of the high-stage side compression mechanism 11a in the above-mentioned high-stage side compressor 11 via a check valve (not shown). Thus, the high-stage side compression mechanism 11a in the present embodiment draws a mixed refrigerant including the intermediate-pressure refrigerant flowing out of the intermediate-pressure refrigerant flow path 16b and the intermediate-pressure refrigerant discharged from the low-stage side compressor 12.

Meanwhile, the outlet side of the high-pressure refrigerant flow path 16a in the intermediate heat exchanger 16 is connected to the inlet side of a low-pressure expansion valve 17. The low-pressure expansion valve 17 is a thermal expansion valve that decompresses and expands the high-pressure refrigerant, flowing out of the heat radiator 13, into the low-pressure refrigerant. The low-pressure expansion valve 17 has substantially the same basic structure as that of the intermediate-pressure expansion valve 15.

More specifically, the low-pressure expansion valve 17 has a thermo-sensitive portion disposed on the side of a refrigerant flow outlet of an evaporator 18 to be described later. The low-pressure expansion valve 17 senses a superheat degree of the refrigerant on the outlet side of the evaporator 18 based on the temperature and pressure of the refrigerant on the outlet side of the evaporator 18. The low-pressure expansion valve 17 adjusts its valve opening and a flow rate of the refrigerant by a mechanical mechanism such that the sensed superheat degree of the refrigerant reaches a predetermined value previously set. The low-pressure expansion valve 17 corresponds to a second expansion valve.

The outlet side of the low-pressure expansion valve 17 is connected to the side of the refrigerant flow inlet of the evaporator 18. The evaporator 18 is a heat-absorption heat exchanger that exchanges heat between the low-pressure refrigerant decompressed and expanded by the low-pressure expansion valve 17 and the ventilation air blown to and circulating through the inside of the refrigerator by a blower fan 18a, thereby evaporating the low-pressure refrigerant to exhibit the heat absorption effect. The blower fan 18a is an electric blower that has the number of revolutions or volume of blowing air controlled by a control voltage output from the refrigerator controller 20.

The refrigerant flow outlet of the evaporator 18 is connected to the side of the suction port of the low-stage side compression mechanism 12a in the low-stage side compressor 12.

The evaporator 18 has an electric heater 18b that is turned on or off according to a control signal output from the refrigerator controller 20. The electric heater 18b generates heat by being energized to thereby heat the evaporator 18. The electric heater 18b is energized during the defrosting operation to remove frost formed at the evaporator 18.

Next, an electric control unit in the present embodiment will be described. The refrigerator controller 20 includes well-known microcomputers that include a CPU for executing control processing and arithmetic processing, as well as storage circuits, such as a ROM and a RAM for storing programs, data, etc., an output circuit for outputting a control signal or a control voltage to the respective control target devices, an input circuit into which a detection signal from each sensor is input, and a power source circuit. The above-mentioned storage circuit is a non-transitory physical storage medium.

The output side of the refrigerator controller 20 is connected to the low-stage side inverter 22, the high-stage side inverter 21, the cooling fan 13a, the blower fan 18a, and the like as the control target devices mentioned above. The refrigerator controller 20 controls the operations of these control target devices.

The refrigerator controller 20 incorporates therein control units for controlling the operations of these control target devices. A component of the refrigerator controller 20 that controls the operation of each control target device configures the control unit for each of the control target devices. The component for controlling the operation of each control target device may be either hardware or software.

In the present embodiment, a first discharge-capacity control unit 20a is defined as a component that controls the operation of the low-stage side inverter 22 to thereby control the refrigerant discharge capacity of the low-stage side compression mechanism 12a. A second discharge-capacity control unit 20b is defined as a component that controls the operation of the high-stage side inverter 21 to thereby control the refrigerant discharge capacity of the high-stage side compression mechanism 11a. The component for controlling the operation of the low-stage side inverter 22 to thereby control the refrigerant discharge capacity of the low-stage side compression mechanism 12a may be either hardware or software. The component for controlling the operation of the high-stage side inverter 21 to thereby control the refrigerant discharge capacity of the high-stage side compression mechanism 11a may be either hardware or software.

Thus, the number of revolutions of the low-stage side electric motor 12b and the number of revolutions of the high-stage side electric motor 11b can be independently controlled from each other by the first discharge-capacity control unit 20a and the second discharge-capacity control unit 20b, respectively. It is apparent that the first and second discharge-capacity control units 20a and 20b may be configured as separate controllers with respect to the refrigerator controller 20.

The input side of the refrigerator controller 20 is connected to an outside-air temperature sensor 23, a blown air temperature sensor 24, a low-pressure sensor 25, an intermediate-pressure sensor 26, a high-pressure sensor 27, a low-pressure temperature sensor 28, and the like. The outside-air temperature sensor 23 detects an outside air temperature Tam of the air outside the refrigerator (i.e., exterior air), which exchanges heat with the high-pressure refrigerant in the heat radiator 13. The blown air temperature sensor 24 detects the blown air temperature of the air having exchanged heat with the low-pressure refrigerant in the evaporator 18 to be blown into the inside of the refrigerator as the space to be cooled. The low-pressure sensor 25 detects the pressure of the low-pressure refrigerant having flowed out of the evaporator 18 to be drawn into the low-stage side compressor 12. The intermediate-pressure sensor 26 detects the pressure of the intermediate-pressure refrigerant discharged from the low-stage side compressor 12. The high-pressure sensor 27 detects the pressure of the high-pressure refrigerant discharged from the high-stage side compressor 11. The low-pressure temperature sensor 28 detects the temperature of the low-pressure refrigerant decompressed by the low-pressure expansion valve 17 to flow into the evaporator 18. Detection signals from these sensors are input to the refrigerator controller 20.

The blown air temperature sensor 24 corresponds to a second physical quantity detector that detects, as a second physical quantity, the temperature of ventilation air heat-exchanged in the evaporator 18 to be blown into the inside of the space to be cooled. The low-pressure temperature sensor 28 corresponds to a first physical quantity detector that detects, as a first physical quantity, the temperature of the refrigerant to flow into the evaporator 18.

An operation panel 30 is connected to the input side of the refrigerator controller 20. The operation panel 30 is provided with an operation/stop switch 30a, a temperature setting switch 30b, and the like. The operation/stop switch 30a serves as a request signal outputting portion that outputs an operation request signal or a stop request signal for the refrigerator. The temperature setting switch 30b serves as a target temperature setting portion that sets a target cooling temperature Tset of the inside of the refrigerator. Operation signals of these switches are input to the refrigerator controller 20.

Next, the operation of the multi-stage compression refrigeration cycle device with the above-mentioned structure in the present embodiment will be described with reference to FIG. 2. FIG. 2 is a flowchart showing control processing executed by the refrigerator controller 20.

The control processing starts when the operation/stop switch on the operation panel 30 is powered (i.e., turned ON) to output an operation request signal. Note that the respective control steps in the flowchart shown in FIG. 2 configure various function execution portions included in the refrigerator controller 20.

First, the refrigerator controller 20 determines whether or not an inlet refrigerant temperature at the evaporator 18 is lower than a reference temperature T1[° C.] previously set (S100). Specifically, the refrigerator controller specifies an inlet refrigerant temperature of the evaporator 18 based on the signal output from the low-pressure temperature sensor 28 and determines whether or not the inlet refrigerant temperature of the evaporator 18 is lower than the reference temperature T1 (for example, 0° C.) previously set. When the inlet refrigerant temperature of the evaporator 18 is relatively high, the possibility of frost formation at the evaporator 18 becomes low. The refrigerator controller 20 determines whether or not the evaporator 18 is under frost formation conditions, based on whether or not the inlet refrigerant temperature at the evaporator 18 is lower than the reference temperature T1[° C.] previously set.

When the inlet refrigerant temperature at the evaporator 18 is equal to or higher than the reference temperature T1[° C.], the determination result in step S100 is NO, and then the refrigerator controller 20 repeatedly executes the determination in step S100. When the inlet refrigerant temperature at the evaporator 18 is lower than the reference temperature T1, the determination result in step S100 is YES, and then, the refrigerator controller 20 specifies an outside air temperature Tam as the temperature of the air outside the refrigerator and a preset temperature of the inside of the refrigerator (S102). The outside air temperature Tam can be specified based on the signal output from the outside-air temperature sensor 23. The preset temperature inside the refrigerator can be specified based on the signal input from the temperature setting switch 30b.

Then, the refrigerator controller 20 specifies a determination threshold value T2 [° C.] and a predetermined time period t1 [minutes], which are parameters used in defrosting determination to be performed in steps S112 and S126 to be described later (S104). As illustrated in FIG. 3, the ROM of the present refrigerator controller 20 stores therein a map that represents the relationship between the determination threshold value T2 and the predetermined time period t1 in relation to the outside air temperature and the preset temperature inside the refrigerator.

The map is specified such that as a temperature difference between the outside air temperature Tam and the preset temperature becomes larger, the determination threshold value T2 increases. The refrigerating capacity of the present refrigeration cycle device becomes larger in the case where the temperature difference between the outside air temperature Tam and the preset temperature is larger, compared to the case where the temperature difference is smaller. Thus, when the above-mentioned temperature difference is large, the inlet refrigerant temperature at the evaporator 18 is low. Consequently, the difference between the inlet refrigerant temperature at the evaporator 18 and the blown air temperature of the air having passed through the evaporator 18 to be blown into the inside of the refrigerator becomes larger. Thus, for example, when the temperature difference between the outside air temperature Tam and the preset temperature is large with the determination threshold value T2 set constant, the determination result is more likely to be NO erroneously in step S112 to be described later, even though no frost formation occurs at the evaporator 18.

In the present embodiment, the determination threshold value T2 is specified to increase as the temperature difference between the outside air temperature Tam and the preset temperature becomes larger. Thus, step S112 (described later) can accurately determine whether or not the defrosting operation of the evaporator 18 is to be started.

The map, which represents the relationship between the determination threshold value T2 and the predetermined time period t1 in relation to the outside air temperature and the preset temperature inside the refrigerator, is specified such that the predetermined time period t1 decreases as the preset temperature inside the refrigerator becomes lower. As the preset temperature inside the refrigerator becomes lower, the temperature of the ventilation air passing through the evaporator 18 becomes lower, and thereby the evaporator 18 is more likely to have frost formed. Therefore, the predetermined time period t1 is specified to decrease as the preset temperature inside the refrigerator becomes lower, so that step S126 described later can accurately determine whether or not the defrosting operation of the evaporator 18 is to be started.

Here, the refrigerator controller 20 specifies the determination threshold value T2 and the predetermined time period t1 with reference to the map stored in the ROM of the refrigerator controller 20 based on the outside air temperature Tam and the preset temperature inside the refrigerator, which are specified in S102.

Then, the refrigerator controller 20 starts counting using a defrosting timer (S106). The refrigerator controller 20 in the present embodiment has the defrosting timer, which is capable of counting the time over 24 hours, in order to perform the defrosting operation on regular basis in the event of failure of the low-pressure temperature sensor 28 or the blown air temperature sensor 24. The refrigerator controller 20 performs a timer defrosting operation by using the defrosting timer. The defrosting timer starts counting according to an instruction from the refrigerator controller 20 and resets a count value according to another instruction from the refrigerator controller 20. Here, the counting is started by use of the defrosting timer. Once counting is started, the defrosting timer continues counting until it is reset.

Subsequently, the refrigerator controller 20 determines whether or not the low-pressure temperature sensor 28 is in an abnormal state in step S108. In the present embodiment, whether or not the low-pressure temperature sensor 28 is in the abnormal state is determined based on whether or not a predetermined voltage is output from the low-pressure temperature sensor 28.

The refrigerator controller 20 determines whether or not the blown air temperature sensor 24 is in the abnormal state in step S110. In the present embodiment, whether or not the blown air temperature sensor 24 is in the abnormal state is determined based on whether or not a predetermined voltage is output from the blown air temperature sensor 24.

When both the low-pressure temperature sensor 28 and the blown air temperature sensor 24 are in the normal state, the refrigerator controller 20 executes step S112. In step S112, it is determined whether or not a difference between the blown air temperature of the air having passed through the evaporator 18 to be blown into the inside of the refrigerator and the inlet refrigerant temperature at the evaporator 18 is smaller than the determination threshold value T2 specified in step S104. The blown air temperature of the air blown into the inside of the refrigerator as the space to be cooled can be detected by the blown air temperature sensor 24. The temperature of the low-pressure refrigerant flowing into the evaporator 18 can be detected by the low-pressure temperature sensor 28.

When no frost is attached to the evaporator 18, the blown air temperature of the air having passed through the evaporator 18 to be blown into the inside of the refrigerator is substantially the same as the inlet refrigerant temperature at the evaporator 18.

In contrast, when frost is attached to the evaporator 18, thereby cooling the refrigerant on the inlet side of the evaporator 18, the inlet refrigerant temperature at the evaporator 18 is significantly decreased. However, the flow rate of ventilation air passing through the evaporator 18 is decreased due to the presence of frost attached to the evaporator 18. Therefore, at this time, the blown air temperature of the air having passed through the evaporator 18 to be blown into the inside of the refrigerator is not decreased so much.

That is, when no frost is attached to the evaporator 18, a difference between the blown air temperature of the air blown into the inside of the refrigerator as the space to be cooled and the inlet refrigerant temperature at the evaporator 18 is small. In contrast, when any frost is attached to the evaporator 18, a difference between the blown air temperature of the air blown into the inside of the refrigerator and the inlet refrigerant temperature at the evaporator 18 becomes large.

The refrigerator controller 20 determines whether or not the defrosting operation of the evaporator 18 is to be started based on whether or not a difference between the inlet refrigerant temperature at the evaporator 18 and the blown air temperature of the air having passed through the evaporator 18 to be blown into the inside of the refrigerator as the space to be cooled is smaller than the determination threshold value T2 specified in step S104.

If no frost is attached to the evaporator 18, and the difference between the inlet refrigerant temperature at the evaporator 18 and the blown air temperature of the air having passed through the evaporator 18 to be blown into the inside of the refrigerator as the space to be cooled is smaller than the determination threshold value T2, the determination result in step S112 is YES. Thus, in this case, the refrigerator controller 20 determines whether or not a count value of the defrosting timer reaches 24 hours in step S114.

If the count value of the defrosting timer does not reach 24 hours, the determination result in step S114 is NO, and then the refrigerator controller 20 returns to step S100. If the count value of the defrosting timer reaches 24 hours, then the refrigerator controller 20 proceeds to step S116.

If any frost is attached to the evaporator 18, and the difference between the inlet refrigerant temperature at the evaporator 18 and the blown air temperature of the air having passed through the evaporator 18 to be blown into the inside of the refrigerator is equal to or larger than the determination threshold value T2, the determination result in step S112 is NO. The refrigerator controller 20 determines whether or not a determination timer is stopping in step S122.

The determination timer is a timer different from the defrosting timer described above. The determination timer starts counting and stops counting according to instructions from the refrigerator controller 20. The determination timer resets the count value according to an instruction from the refrigerator controller 20.

Here, suppose that the determination timer is reset to stop counting. In this way, when the determination timer stops counting, the determination result in step S122 is YES, and then the refrigerator controller 20 starts counting using the determination timer in step S124. Thus, the determination timer starts clocking after the state of resetting.

Then, in step S126, it is determined whether or not the predetermined time period t1, determined in step S104, has elapsed based on the count value of the determination timer. If the predetermined time period t1 has not elapsed since the start of counting by the determination timer, the determination result in step S126 is NO, and then the refrigerator controller 20 returns to step S100.

When frost is kept attached to the evaporator 18, the determination result in step S112 is NO. Since the determination timer has already started counting, the determination result in step S122 is also NO. If the predetermined time period t1 has not elapsed since the start of counting by the determination timer, the determination result in step S126 is NO, and then the refrigerator controller 20 returns to step S100.

If the predetermined time period t1 has elapsed since the start of counting by the determination timer, and the determination result in step S126 is YES, the refrigerator controller 20 performs the defrosting operation in step S116. Suppose that over the predetermined time period t1 or longer, the refrigeration cycle device continues to be in the state where the difference between the inlet refrigerant temperature at the evaporator 18 and the blown air temperature of the air having passed through the evaporator 18 to be blown into the inside of the refrigerator is equal to or larger than the determination threshold value T2. In this state, the refrigerator controller 20 performs the defrosting operation. Specifically, the refrigerator controller 20 starts and continues energization of the electric heater 18b for a certain time period and performs the defrosting operation. The energization of the electric heater 18b generates heat from the electric heater 18b, thereby defrosting the evaporator 18.

The refrigerator controller 20 stops a cooling operation during the defrosting operation. Specifically, the refrigerator controller 20 stops driving of the high-stage side compressor 11 and the low-stage side compressor 12. After a certain time period has elapsed since the start of the defrosting operation, the defrosting operation is finished, and the cooling operation is restarted.

Then, in step S118, the defrosting timer is reset. Thus, the count value of the defrosting timer is reset. Then, in step S120, the determination timer is reset, and the refrigerator controller returns to step S100. Thus, the count value of the determination timer is reset.

If the predetermined voltage is not output from the low-pressure temperature sensor 28, and the determination result in step S108 is YES, the refrigerator controller 20 proceeds to step S114 to determine whether or not the count value of the defrosting timer reaches 24 hours.

If the count value of the defrosting timer reaches 24 hours, then the refrigerator controller 20 proceeds to step S116 to perform the defrosting operation. After the defrosting operation is finished, the defrosting timer is reset in step S118.

If the predetermined voltage is not output from the blown air temperature sensor 24, and the determination result in step S110 is YES, the refrigerator controller 20 proceeds to step S114 to determine whether or not the count value of the defrosting timer reaches 24 hours.

If the count value of the defrosting timer reaches 24 hours, then the refrigerator controller 20 proceeds to step S116 to perform the defrosting operation. After the defrosting operation is finished, the defrosting timer is reset in step S118.

With the above-mentioned configuration, the present refrigeration cycle device includes the low-pressure temperature sensor 28 that detects the temperature of the refrigerant flowing into the evaporator 18 and the blown air temperature sensor 24 that detects the temperature of ventilation air heat-exchanged in the evaporator 18 to be blown into the inside of the space to be cooled. A defrosting operation determination portion determines whether or not the defrosting operation of the evaporator is to be started based on whether or not the temperature difference between the temperature of the refrigerant detected by the low-pressure temperature sensor 28 and the temperature of the ventilation air detected by the blown air temperature sensor 24 is equal to or larger than the determination threshold value T2. A defrosting operation execution portion performs the defrosting operation of the evaporator when the defrosting operation determination portion determines that the defrosting operation of the evaporator is to be started. The defrosting operation determination portion corresponds to steps S112, S122, S124, and S126, while the defrosting operation execution portion corresponds to step S116.

Thus, the defrosting operation determination portion determines whether or not the defrosting operation of the evaporator is to be started based on whether or not the temperature difference between the temperature of the refrigerant detected by the low-pressure temperature sensor 28 and the temperature of the ventilation air detected by the blown air temperature sensor 24 is equal to or larger than the determination threshold value T2. Therefore, the defrosting operation of the evaporator is prevented from being periodically started in a short-period cycle even though no frost is formed at the evaporator, thereby making it possible to reduce the power consumption, accompanied by the defrosting operation.

Consequently, the frequency of stopping the cooling operation during the defrosting operation is also lessened. Thus, for example, in container refrigerators, the temperature inside the refrigerator can also be prevented from increasing frequently. Such prevention of the frequent increase in the temperature is very effective in the use of the container refrigerators for foods that need to maintain freshness.

The defrosting operation determination portion determines whether or not the defrosting operation of the evaporator is to be started based on whether or not the temperature difference between the temperature of the refrigerant detected by the low-pressure temperature sensor 28 and the temperature of the ventilation air detected by the blown air temperature sensor 24 continues to be equal to or larger than the determination threshold value T2 over the predetermined time period t1 or longer. Therefore, the determination can be made on whether or not the defrosting operation of the evaporator is to be started with higher accuracy, compared to a case in which the start of the defrosting operation of the evaporator is determined based on simply whether or not the temperature difference between the temperature of the refrigerant detected by the low-pressure temperature sensor 28 and the temperature of the ventilation air detected by the blown air temperature sensor 24 is equal to or larger than the determination threshold value T2.

The refrigeration cycle device includes the outside-air temperature sensor 23 that detects the outside air temperature and the temperature setting switch 30b that sets the target cooling temperature of the space to be cooled. The defrosting operation determination portion can specify at least one of the determination threshold value and the predetermined time period based on the outside air temperature detected by the outside-air temperature sensor 23 as well as the target cooling temperature of the space to be cooled set by the temperature setting switch 30b.

The defrosting operation determination portion determines whether or not the defrosting operation of the evaporator is to be started, by setting the determination threshold value such that as the temperature difference between the outside air temperature detected by an outside-air temperature detector and the target cooling temperature of the space to be cooled set by a temperature setting portion becomes larger, the determination threshold value increases. Thus, the defrosting operation determination portion can be prevented from erroneously determining that the defrosting operation of the evaporator 18 is to be started, even when no frost formation occurs at the evaporator 18.

The defrosting operation determination portion determines whether or not the defrosting operation of the evaporator 18 is to be started, by setting the predetermined time period such that as the target cooling temperature of the space to be cooled becomes lower, the predetermined time period is shortened. Thus, whether or not the defrosting operation of the evaporator 18 is to be started can be determined with higher accuracy.

The present refrigeration cycle device includes an abnormality determination portion that determines whether or not at least one of the low-pressure temperature sensor 28 and the blown air temperature sensor 24 is in the abnormal state. The abnormality determination portion corresponds to steps S108 and S110. When the abnormality determination portion determines that at least one of the low-pressure temperature sensor 28 and the blown air temperature sensor 24 is in the abnormal state, the defrosting operation execution portion performs the defrosting operation of the evaporator every prescribed period. That is, when at least one of the low-pressure temperature sensor 28 and the blown air temperature sensor 24 is brought into the abnormal state, a timer defrosting operation is performed to execute the defrosting operation of the evaporator on regular basis. Thus, cargoes and the like in the space to be cooled can be prevented from being damaged by an increase in the temperature of the space to be cooled due to frost formation at the evaporator when the determination of no frost formation at the evaporator is erroneously made even though frost is formed at the evaporator.

Other Embodiments (1) While in the above-mentioned embodiments, the present disclosure is applied to the two-stage compression refrigeration cycle that includes a first compression mechanism 12a and a second compression mechanism 11a, the present disclosure can also be applied to a refrigeration cycle device including one compression mechanism that compresses and discharges the refrigerant.

(2) While in the above-mentioned embodiments, the present disclosure is applied to the multi-stage compression refrigeration cycle having two-stage compression mechanisms on the high-stage side and the low-stage side, the present disclosure can also be applied to a multi-stage compression refrigeration cycle device that includes three or more stages of compression mechanisms.

(3) While in the above-mentioned embodiments, the electric heater is used to perform the defrosting of the evaporator, the so-called hot gas bypass cycle may be configured by circulating a refrigerant discharged from a compression mechanism through an evaporator, a bypass passage, and the compression mechanism in this order in a defrosting operation mode, thereby defrosting the evaporator, like a device described in, for example, Japanese Unexamined Patent Application Publication No. 2012-255603.

(4) While the above-mentioned embodiments have described the cycle structure that adopts the intermediate heat exchanger 16, the cycle structure of the two-stage pressurizing refrigeration cycle in the present disclosure is not limited thereto. For example, the intermediate heat exchanger 16 may be eliminated, and an intermediate gas-liquid separator may be provided to separate the refrigerant flowing out of the intermediate-pressure expansion valve 15 into a gas-phase refrigerant and a liquid-phase refrigerant. The gas-phase refrigerant separated by the intermediate gas-liquid separator may be drawn into the high-stage side compressor 11. In this case, the intermediate-pressure expansion valve 15 may be eliminated, and instead of this, a fixed throttle may be adopted. Further, the branch portion 14 may be eliminated, and the liquid-phase refrigerant separated by the intermediate gas-liquid separator may be caused to flow into the low-pressure expansion valve 17, thereby configuring an economizer refrigeration cycle.

(5) In the above-mentioned embodiments, whether or not the defrosting operation of the evaporator 18 is to be started is determined by using the temperature of the low-pressure refrigerant flowing into the evaporator 18, detected by the low-pressure temperature sensor 28. Meanwhile, instead of the low-pressure temperature sensor 28, a low-pressure sensor may be provided to detect the pressure of the low-pressure refrigerant as the physical quantity that has a correlation with the temperature of the low-pressure refrigerant. Subsequently, the temperature of the low-pressure refrigerant flowing into the evaporator 18 is estimated from the pressure of the low-pressure refrigerant, detected by the low-pressure sensor, and then whether or not the defrosting operation of the evaporator 18 is to be started can also be determined by using the estimated temperature of the low-pressure refrigerant.

(6) In the above-mentioned embodiments, whether or not the defrosting operation of the evaporator 18 is to be started is determined by using the temperature of the low-pressure refrigerant flowing into the evaporator 18, detected by the low-pressure temperature sensor 28. Meanwhile, instead of the low-pressure temperature sensor 28, a refrigerant temperature sensor may be provided to detect the temperature of the refrigerant flowing out of the evaporator 18 that has a correlation with the temperature of the low-pressure refrigerant flowing into the evaporator 18. Subsequently, the temperature of the low-pressure refrigerant flowing into the evaporator 18 is estimated from the temperature of the refrigerant, detected by the refrigerant temperature sensor, and then whether or not the defrosting operation of the evaporator 18 is to be started can also be determined by using the estimated temperature of the low-pressure refrigerant.

(7) In the above-mentioned embodiments, the blown air temperature sensor 24 is provided to detect the blown air temperature of the air having exchanged heat with the low-pressure refrigerant in the evaporator 18 to be blown into the inside of the refrigerator as the space to be cooled. Subsequently, the refrigerator controller 20 determines whether or not the defrosting operation of the evaporator 18 is to be started by the use of the blown air temperature, detected by the blown air temperature sensor 24. Meanwhile, instead of the blown air temperature sensor 24, a return temperature sensor may be provided. The return temperature sensor detects the temperature of the ventilation air blown into the inside of the refrigerator and drawn into the evaporator 18, i.e., the temperature of the air returning from the inside of the refrigerator into the evaporator 18, as a physical quantity having a correlation with the blown air temperature of the air blown into the inside of the refrigerator as the space to be cooled. Subsequently, the refrigerator controller 20 estimates the blown air temperature from the temperature of the air detected by the return temperature sensor, and thereby can also determine whether or not the defrosting operation of the evaporator 18 is to be started by the use of the blown air temperature.

(8) The above-mentioned embodiments adopt a fluorocarbon refrigerant (for example, R404A) as the refrigerant. However, the refrigerant in use is not limited to the fluorocarbon refrigerant and may be, for example, a refrigerant containing carbon dioxide as a main component.

(9) In the above-mentioned embodiments, the determination threshold value T2 and the predetermined time period t1 are specified by using the map, which represents the relationship between the determination threshold value T2 and the predetermined time period t1 in relation to the preset temperature inside the refrigerator and the outside air temperature. At this time, the determination threshold value T2 and the predetermined time period t1 may be specified such that the determination threshold value T2 and the predetermined time period t1 vary in stages according to the preset temperature inside the refrigerator and the outside air temperature. Thus, the determination accuracy of whether or not the defrosting operation of the evaporator 18 should be started can be improved.

Note that the present disclosure is not limited to the above-mentioned embodiments, and various modifications and changes can be made to these embodiments as appropriate. It is obvious that in the above-mentioned respective embodiments, the elements configuring the embodiments are not necessarily essential particularly unless otherwise specified to be essential, except when clearly considered to be essential in principle, and the like. Even when referring to specific numbers about a component, including the number, a numerical value, an amount, a range, and the like in the above-mentioned respective embodiments, the component in the embodiments should not be limited to the specific number particularly unless otherwise specified, and except when obviously limited to the specific number in principle.

CONCLUSION

According to a first aspect shown by a part or all of the above-mentioned embodiments, the present refrigeration cycle device includes: a first physical quantity detector (28) that detects a first physical quantity having a correlation with a temperature of the refrigerant flowing into the evaporator; and a second physical quantity detector (24) that detects a second physical quantity having a correlation with a temperature of the ventilation air heat-exchanged in the evaporator to be blown into the space to be cooled. When a temperature difference between the temperature of the refrigerant specified based on the first physical quantity and the temperature of the ventilation air specified based on the second physical quantity, the ventilation air being blown into the space to be cooled, is equal to or larger than a determination threshold value (T2), it is determined that the defrosting operation of the evaporator is to be started, and thereby the defrosting operation of the evaporator is performed. Thus, the defrosting operation of the evaporator is prevented from being periodically started even when no frost is formed at the evaporator, thereby making it possible to reduce the power consumption, accompanied by the defrosting operation.

According to a second aspect shown by a part or all of the above-mentioned embodiments, the compression mechanism includes: a first compression mechanism (12a) that compresses and discharges the refrigerant; and a second compression mechanism (11a) that compresses and discharges the refrigerant discharged from the first compression mechanism, wherein the heat radiator can exchange heat between the refrigerant discharged from the second compression mechanism and the exterior air to thereby dissipate heat from the refrigerant, and the first expansion valve can decompress and expand the refrigerant flowing out of the heat radiator to thereby flow out the decompressed refrigerant to the suction side of the second compression mechanism.

According to a third aspect shown by a part or all of the above-mentioned embodiments, the defrosting operation determination portion determines whether or not the defrosting operation of the evaporator is to be started based on whether or not the temperature difference between the temperature of the refrigerant specified based on the first physical quantity and the temperature of the ventilation air specified based on the second physical quantity, the ventilation air being blown into the space to be cooled, continues to be equal to or larger than the determination threshold value (T2) over a predetermined time period (t1) or longer. In this way, the predetermined time period (t1) is included in a criterion of the determination about whether or not the defrosting operation of the evaporator is to be started, so that the presence or absence of frost formation at the evaporator can be determined with higher accuracy.

According to a four aspect shown by a part or all of the above-mentioned embodiments, the refrigeration cycle device further includes an outside-air temperature detector (23) that detects an outside air temperature and a temperature setting portion (30b) that sets a target cooling temperature of the space to be cooled. The defrosting operation determination portion can specify at least one of the determination threshold value and the predetermined time period based on the outside air temperature detected by the outside-air temperature detector and the target cooling temperature of the space to be cooled set by the temperature setting portion.

According to a fifth aspect shown by a part or all of the above-mentioned embodiments, the defrosting operation determination portion determines whether or not the defrosting operation of the evaporator is to be started, by setting the determination threshold value such that as the temperature difference between the outside air temperature detected by the outside-air temperature detector and the target cooling temperature of the space to be cooled set by the temperature setting portion becomes larger, the determination threshold value increases. Thus, the defrosting operation determination portion can prevent the erroneous determination that the defrosting operation of the evaporator is to be started even when no frost formation occurs at the evaporator 18.

According to a sixth aspect shown by a part or all of the above-mentioned embodiments, the defrosting operation determination portion determines whether or not the defrosting operation of the evaporator 18 is to be started, by setting the predetermined time period such that as the target cooling temperature of the space to be cooled becomes lower, the predetermined time period is shortened. Thus, whether or not the defrosting operation of the evaporator is to be started can be determined with higher accuracy.

According to a seventh aspect shown by a part or all of the above-mentioned embodiments, the refrigeration cycle device further includes an abnormality determination portion (S108, S110) that determines whether or not at least one of the first physical quantity detector and the second physical quantity detector is in an abnormal state. The defrosting operation execution portion performs the defrosting operation of the evaporator every prescribed period, when the abnormality determination portion determines that at least one of the first physical quantity detector and the second physical quantity detector is in the abnormal state. Thus, cargoes and the like in the space to be cooled can be prevented from being damaged by an increase in the temperature of the space to be cooled due to frost formation at the evaporator when the determination of no frost formation at the evaporator is erroneously made even though frost is formed at the evaporator.

For example, in the above description, steps S112, S122, S124, and S126 correspond to the defrosting operation determination portion; step S116 corresponds to the defrosting operation execution portion; and steps S108 and S110 correspond to the abnormality determination portion.

What is claimed is:

1. A refrigeration cycle device in which a refrigerant circulates, the refrigeration cycle device comprising:
a compressor configured to compress and discharge the refrigerant;
a heat radiator that exchanges heat between the refrigerant discharged from the compressor and outside air to dissipate heat from the refrigerant;
an expansion valve that decompresses the refrigerant flowing out of the heat radiator;
an evaporator that exchanges heat between the refrigerant decompressed by the expansion valve and ventilation air to be blown into a space to be cooled, to evaporate the refrigerant and to cause the refrigerant to flow to a suction side of the compressor;
a first physical quantity detector configured to detect a first physical quantity relative to a temperature of the refrigerant flowing into the evaporator;
a second physical quantity detector configured to detect a second physical quantity relative to a temperature of the ventilation air that is heat-exchanged in the evaporator to be blown into the space to be cooled;
an outside-air temperature detector configured to detect an outside air temperature; and
a controller configured to
determine a defrosting threshold value based on both the outside air temperature detected by the outside-air temperature detector and a target cooling temperature of the space to be cooled by the evaporator and set by a temperature setting portion,
determine whether a temperature difference between the temperature of the refrigerant specified based on the first physical quantity, detected by the first physical quantity detector, and the temperature of the ventilation air specified based on the second physical quantity, detected by the second physical quantity detector, is equal to or larger than the defrosting threshold value, and
start and perform a defrosting operation of the evaporator when the temperature difference is equal to or larger than the defrosting threshold value.

2. The refrigeration cycle device according to claim 1, further comprising:
a first expansion valve, wherein
the expansion valve is a second expansion valve,
the compressor comprising:
a first compressor configured to compress and discharge the refrigerant; and
a second compressor configured to compress and discharge the refrigerant discharged from the first compressor, wherein
the heat radiator exchanges heat between the refrigerant discharged from the second compressor and the outside air to dissipate heat from the refrigerant, and
the first expansion valve decompresses and expands the refrigerant flowing out of the heat radiator and causes the decompressed refrigerant to flow to a suction side of the second compressor.

3. The refrigeration cycle device according to claim 1, wherein
the controller determines whether the temperature difference between the temperature of the refrigerant specified based on the first physical quantity detected by the first physical quantity detector and the temperature of the ventilation air specified based on the second physical quantity detected by the second physical quantity detector, continues to be equal to or larger than the defrosting threshold value over a predetermined time period or longer.

4. A refrigeration cycle device in which a refrigerant circulates, the refrigeration cycle device comprising:
a compressor configured to compress and discharge the refrigerant;
a heat radiator that exchanges heat between the refrigerant discharged from the compressor and outside air to dissipate heat from the refrigerant;
an expansion valve that decompresses the refrigerant flowing out of the heat radiator;
an evaporator that exchanges heat between the refrigerant decompressed by the expansion valve and ventilation air to be blown into a space to be cooled, to evaporate the refrigerant and to cause the refrigerant to flow to a suction side of the compressor;
a first physical quantity detector configured to detect a first physical quantity relative to a temperature of the refrigerant flowing into the evaporator;
a second physical quantity detector configured to detect a second physical quantity relative to a temperature of the ventilation air that is heat-exchanged in the evaporator to be blown into the space to be cooled;
an outside-air temperature detector configured to detect an outside air temperature; and
a controller configured to
determine a predetermined time period based on both the outside air temperature detected by the outside-air temperature detector and a target cooling temperature of the space to be cooled by the evaporator and set by a temperature setting portion,
determine whether a temperature difference between the temperature of the refrigerant specified based on the first physical quantity, detected by the first physical quantity detector, and the temperature of the ventilation air specified based on the second physical quantity, detected by the second physical quantity detector, is equal to or larger than a defrosting threshold value and continues for the predetermined time period or longer, and
start and perform a defrosting operation of the evaporator when the temperature difference is equal to or larger than the defrosting threshold value and continues for the predetermined time period or longer.

5. The refrigeration cycle device according to claim 1, wherein
the controller is configured to make the defrosting threshold value larger as the temperature difference between the outside air temperature detected by the outside-air temperature detector and the target cooling temperature of the space to be cooled set by the temperature setting portion becomes larger.

6. The refrigeration cycle device according to claim 4, wherein
the controller is configured to make the predetermined time period shorter as the target cooling temperature of the space to be cooled becomes lower.

7. The refrigeration cycle device according to claim 1, further comprising:
an abnormality determination portion that determines whether at least one of the first physical quantity detector or the second physical quantity detector is in an abnormal state, wherein
the controller is configured to perform the defrosting operation of the evaporator every prescribed period, when the abnormality determination portion determines that at least one of the first physical quantity detector or the second physical quantity detector is in the abnormal state.

8. The refrigeration cycle device according to claim 1, wherein
the first physical quantity is a temperature or a pressure of the refrigerant decompressed by the expansion valve.

9. The refrigeration cycle device according to claim 1, wherein
the second physical quantity is a temperature of the ventilation air heat-exchanged in the evaporator to be blown into the space to be cooled, or a temperature of the air returning from the space to be cooled to the evaporator.

10. A refrigeration cycle device in which a refrigerant circulates, the refrigeration cycle device comprising:
a compressor configured to compress and discharge the refrigerant;
a heat radiator that exchanges heat between the refrigerant discharged from the compressor and outside air to dissipate heat from the refrigerant;
an expansion valve that decompresses the refrigerant flowing out of the heat radiator;
an evaporator that exchanges heat between the refrigerant decompressed by the expansion valve and ventilation air to be blown into a space to be cooled, to evaporate the refrigerant and to cause the refrigerant to flow to a suction side of the compressor;
a first physical quantity detector configured to detect a first physical quantity relative to a temperature of the refrigerant flowing into the evaporator;
a second physical quantity detector configured to detect a second physical quantity relative to a temperature of the ventilation air that is heat-exchanged in the evaporator to be blown into the space to be cooled; and
a controller configured to
determine whether a temperature difference between the temperature of the refrigerant specified based on the first physical quantity, detected by the first physical quantity detector, and the temperature of the ventilation air specified based on the second physical quantity, detected by the second physical quantity detector, is equal to or larger than a defrosting threshold value and continues for a predetermined time period or longer,
reduce the predetermined time period as a target cooling temperature of the space to be cooled by the evaporator and set by a temperature setting portion becomes lower, and
start and perform a defrosting operation of the evaporator when the temperature difference is equal to or larger than the defrosting threshold value and continues for the predetermined time period or longer.

11. The refrigeration cycle device according to claim 10, further comprising:
an abnormality determination portion that determines whether at least one of the first physical quantity detector or the second physical quantity detector is in an abnormal state, wherein
the controller is configured to perform the defrosting operation of the evaporator every prescribed period, when the abnormality determination portion determines that at least one of the first physical quantity detector or the second physical quantity detector is in the abnormal state.

12. The refrigeration cycle device according to claim 4, further comprising:
an abnormality determination portion that determines whether at least one of the first physical quantity detector or the second physical quantity detector is in an abnormal state, wherein
the controller is configured to perform the defrosting operation of the evaporator every prescribed period, when the abnormality determination portion determines that at least one of the first physical quantity detector or the second physical quantity detector is in the abnormal state.

13. The refrigeration cycle device according to claim 1, wherein the temperature setting portion is a temperature setting switch.

14. The refrigeration cycle device according to claim 4, wherein the temperature setting portion is a temperature setting switch.

15. The refrigeration cycle device according to claim 10, wherein the temperature setting portion is a temperature setting switch.

16. The refrigeration cycle device according to claim 4, wherein the predetermined time period decreases as the target cooling temperature of the space to be cooled by the evaporator and set by the temperature setting portion becomes lower.

* * * * *